US011187310B2

(12) United States Patent
Eisenhardt et al.

(10) Patent No.: US 11,187,310 B2
(45) Date of Patent: Nov. 30, 2021

(54) GEAR MECHANISM, USE OF A GEAR MECHANISM AND METHOD FOR A GEAR MECHANISM

(71) Applicant: DEERE & COMPANY, Moline, IL (US)

(72) Inventors: Christoph Eisenhardt, Mannheim (DE); Stefan Raisch, Vaihingen/Enz (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/068,178

(22) Filed: Oct. 12, 2020

(65) Prior Publication Data

US 2021/0123511 A1   Apr. 29, 2021

(30) Foreign Application Priority Data

Oct. 23, 2019 (DE) .......................... 102019216300.9

(51) Int. Cl.
 *F16H 37/04* (2006.01)
(52) U.S. Cl.
 CPC ... *F16H 37/046* (2013.01); *F16H 2200/0078* (2013.01); *F16H 2200/2007* (2013.01)
(58) Field of Classification Search
 CPC .............. F16H 37/046; F16H 37/0833; F16H 2037/047; F16H 2037/049; F16H 37/04
 See application file for complete search history.

(56) References Cited

U.S. PATENT DOCUMENTS

| 8,596,157 | B2 | 12/2013 | Vu |
| 9,879,761 | B2 | 1/2018 | Vu |
| 10,086,686 | B2 | 10/2018 | Mueller et al. |
| 10,240,668 | B2 | 3/2019 | Raisch |
| 10,352,401 | B2 | 7/2019 | Raisch et al. |
| 10,539,207 | B2 | 1/2020 | Raisch et al. |
| 2015/0300470 | A1* | 10/2015 | Markl ............... B60K 17/3467 475/207 |

(Continued)

FOREIGN PATENT DOCUMENTS

| DE | 10260179 A1 | 7/2004 |
| DE | 102011084037 A1 | 3/2013 |

(Continued)

OTHER PUBLICATIONS

European Search Report issued in counterpart application No. 20198068.7 dated Mar. 19, 2021 (16 pages).

*Primary Examiner* — Huan Le

(57) ABSTRACT

A gear mechanism includes at least a first and a second shaft, and at least a first and a second switching group arranged between the first and the second shafts. Each of the switching groups includes at least two transmission units which are individually switched and have a different transmission ratio. The first switching group is movable into active connection with the first shaft by a planetary stage which is constructed such that a mechanical power which is introduced via the first shaft is transmitted to the second shaft via a first or a second power path. At least one transmission unit of the first switching group is associated with each power path and in at least one switching state of the first switching group, the power flow extends over at least one transmission unit of the first and the second power path.

21 Claims, 4 Drawing Sheets

(56) References Cited

U.S. PATENT DOCUMENTS

2015/0375736 A1\* 12/2015 Kaltenbach .......... B60W 20/00
477/5

FOREIGN PATENT DOCUMENTS

| DE | 102014226469 A1 | 6/2016 |
|----|-----------------|--------|
| DE | 102015211809 A1 | 12/2016 |
| EP | 1367296 B1 | 12/2011 |
| EP | 3109509 A1 | 12/2016 |

\* cited by examiner

| Gear Speed | Planetary clutch 62 | First switching group 40 ||||  Second switching group 50 ||||
|---|---|---|---|---|---|---|---|---|---|
| | 62 | 41 | 43 | 42 | 44 | 57 | 53 | 54 | 55 |
| 1 | X | X | | | | X | | | |
| 2 | | X | | | | X | | | |
| 3 | X | | X | | | X | | | |
| 4 | | | X | | | X | | | |
| 5 | X | | X | X | | X | | | |
| 6 | | | | X | X | X | | | |
| 7 | X | | | X | X | X | | | |
| 8 | X | X | | | | | X | | |
| 9 | | X | | | | | X | | |
| 10 | X | | X | | | | X | | |
| 11 | | | X | | | | X | | |
| 12 | X | | X | X | | | X | | |
| 13 | | | | X | X | | X | | |
| 14 | X | | | X | X | | X | | |
| 15 | X | X | | | | | | X | |
| 16 | | X | | | | | | X | |
| 17 | X | | X | | | | | X | |
| 18 | | | X | | | | | X | |
| 19 | X | | X | X | | | | X | |
| 20 | | | | X | X | | | X | |
| 21 | X | | | X | X | | | X | |
| 22 | X | X | | | | | | | X |
| 23 | X | X | | | | | | | X |
| 24 | | | X | | | | | | X |
| 25 | X | | X | | | | | | X |
| 26 | | | X | X | | | | | X |
| 27 | X | | | X | | | | | X |
| 28 | | | | X | X | | | | X |

FIG. 4

GEAR MECHANISM, USE OF A GEAR MECHANISM AND METHOD FOR A GEAR MECHANISM

RELATED APPLICATIONS

This application claims priority to German Application No. 102019216300.9, filed Oct. 23, 2019, the disclosure of which is hereby expressly incorporated by reference in its entirety.

FIELD OF THE DISCLOSURE

The present disclosure relates to a gear mechanism having at least a first and a second shaft, wherein at least a first and a second switching group are arranged between the first and the second shaft, wherein each of the switching groups has at least two transmission units which can be switched individually in order to transmit a torque and which differ from each other in terms of their transmission ratio.

BACKGROUND

Conventional gear mechanisms are generally used as so-called power shift transmissions in agricultural machines and serve to transmit mechanical power from a drive motor to a drive train of the corresponding vehicle. In this instance, it is decisive for the gear mechanisms to be configured in such a manner that, on the one hand, a large spread is ensured and at the same time the mass inertia which is intended to be synchronised is as low as possible. For this reason, such gear mechanisms generally have a large number of gears in order to be able to bridge the large spread. These individual gears are produced by connecting the two switching groups to each other, wherein the first switching group is generally also referred to as a gear change group and the second switching group is referred to as a range switching group. If at least both switching groups have at least two transmission units, a total of four gears can be produced, wherein the minimum number of gears is produced from the product of the number of both switching groups.

Based on this prior art, it is always desirable to increase the number of gears in order to be able to form the transitions with respect to the transmission ratios between the individual gears in the smoothest possible manner within the spread. Furthermore, these gears should also where possible be able to be switched under load. A gear in the context of the present disclosure is always intended to be understood to be a combination of connected transmission units of the first and second switching group which together produce a specific transmission ratio between the first and second shaft.

Thus, there is a need to provide a gear mechanism which is characterized by a large number of gears and at the same time a small number of couplings.

SUMMARY

According to the present disclosure, a first switching group can be moved into active connection with a first shaft by a planetary stage, wherein the planetary group is constructed in such a manner that a mechanical power which is introduced via the first shaft can be transmitted to a second shaft via a first or via a second power path which can be coupled or uncoupled, wherein at least one transmission unit of the first switching group is associated with each power path and wherein in at least one switching state of the first switching group the power flow extends over at least one transmission unit of the first and the second power path in each case.

Accordingly, the first switching group is constructed in such a manner that the power can be transmitted not only via only one, but instead also via at least two power paths, wherein the transmission of the power is carried out accordingly via an associated transmission unit in each case. For example, toothed wheel pairs are considered as a transmission unit, wherein the transmission ratio of such a toothed wheel pair is produced from the diameter difference of the individual toothed wheels. In the context of the present disclosure, the toothed wheels of these toothed wheel pairs are also referred to as a drive toothed wheel and as an output toothed wheel, wherein a torque is transmitted from the drive toothed wheel to the output toothed wheel. With a direct coupling, both shafts are directly connected to each other so that consequently the transmission ratio assumes a value of i=1, wherein the value i represents the transmission ratio and is produced from the ratio of the speed of the drive shaft to the speed of the output shaft. Such a transmission ratio may, of course, also be produced with a gear pair.

In one embodiment of the present disclosure, the first switching group has at least two outer shaft portions which coaxially surround the first shaft, wherein at least one of the transmission units is arranged on one of the outer shaft portions and wherein a first outer shaft portion is associated with the first power path and a second outer shaft portion is associated with the second power path. Accordingly, at least two transmission units are arranged on two outer shaft portions which can be rotated independently of each other. It is thereby possible for both power paths to be able to be connected at the same time since the speed of both outer shaft portions can be uncoupled from each other.

In order to incorporate these outer shaft portions in the individual power paths, the planetary stage has a power input and at least two power outputs which are each connected to one of the power paths, wherein there is arranged between the two power outputs of the planetary stage, a planetary coupling which in a connected state connects the two power outputs directly to each other. Planetary stages generally have a large number of wheels which rotate around each other and which can be used either as a power input or also as a power output. For example, the wheels may be provided as sun gears, planetary gears and ring gears, wherein in particular ring gears do not represent a compulsory component of such a planetary gear stage. The sun gear is located in the center of the planetary gear and is rotated around by the planetary gears, wherein the planetary gears are connected to each other by a planetary carrier. Accordingly, the sun gear, the planetary carrier and also the ring gear can be used as a power input or as a power output. To this end, there is a connection to the corresponding shaft, wherein in the context of the present disclosure two power outputs of the planetary stage are each or can each be connected to an outer shaft portion and wherein the power input is connected to the first shaft directly or with the incorporation of an additional transmission unit. Via this additional transmission unit, it is possible, for example, to carry out a gear reduction or multiplication.

Another embodiment of the planetary stage provides for at least two sun gears which are arranged beside each other and two planetary gear sets which are arranged beside each other, wherein each planetary gear set comprises a planetary carrier and individual planetary gears. The planetary carriers are coupled directly to each other and further connected as a first power output to one of the outer shaft portions. The second power output is implemented by a sun gear, which is accordingly connected to the other outer shaft portion. The other sun gear acts as a power input so that in each case a sun gear is provided as a power input and a sun gear is provided as a power output. The two sun wheels which are arranged beside each other and planet wheel sets are further configured in such a manner that they differ from each other in terms of their transmission ratio. Thus, the sun gear in the power input is constructed to be larger than in the power output and the planetary gears in the power input are constructed to be correspondingly smaller than in the power output.

By connecting the planetary coupling, it is possible for both power outputs and consequently both outer shaft portions to have the same speed. Accordingly, a connection occurs only when only one transmission unit is connected or when the power is intended to be transmitted only via one power path. If a connection of a transmission unit is intended to be carried out in both power paths, the planetary coupling has to be uncoupled so that both speeds of the outer shaft portions or in both power paths are independent of each other.

According to a further embodiment, the planetary coupling is constructed as a multi-disc clutch with an inner and an outer disc carrier, wherein the disc carriers are connected in each case to one of the power outputs of the planetary stage and one of the power paths, in particular to one of the outer shaft portions. The outer disc carrier is connected to the planetary carrier of the planetary stage and the inner disc carrier is connected to the sun gear of the planetary stage which acts as the power output.

There is also associated with each transmission unit of the first switching group a clutch which is also constructed as a multi-disc clutch and via which the transmission unit can be coupled or uncoupled.

A clutch, in particular a multi-disc clutch, is also provided between the first shaft and the power input. This has the advantage that in a simple manner a reversing unit can be arranged between the first shaft and the planetary stage which is also constructed to be able to be coupled and which in the coupled state brings about a reversal of the rotation direction of the planetary stage. In such a case, the coupling between the first shaft and the power input of the planetary stage is released, wherein the power input, for example, on the sun wheel of the planetary stage, is also connected to an outer shaft portion, which coaxially surrounds the first shaft. This outer shaft portion is consequently adjoined not only by the clutch which brings about a connection between the first shaft and the power input, but also a reversing transmission unit which is part of the reversing unit and which brings about a reversal of the rotation direction. This reversing transmission unit may, for example, be constructed in the form of a three-part toothed gear set and can accordingly be coupled or uncoupled by a reversing clutch, for example, a multi-disc clutch. Accordingly, this reversing clutch is activated only when a reversal of the rotation direction is required, wherein at the same time the coupling between the first shaft and the power input or the outer shaft portion of the first power input is uncoupled.

On the whole, it has been found to be particularly advantageous for the reversing unit to be arranged in front of the planetary stage and consequently also in front of the two switching groups so that, even in the event of a reversed rotation direction, for example, when travelling backwards, the full number of gears are available and consequently also in reverse mode the gear spread is filled in the most complete manner possible.

According to a development of the present disclosure, a third shaft is arranged between the first shaft and the second shaft, wherein the first switching group is arranged between the first and the second shaft and the second switching group is arranged between the second and the third shaft. The second and the third shaft may, for example, be arranged coaxially beside each other or parallel with each other. An arrangement coaxially with respect to each other is referred to as a so-called dual shaft arrangement and a parallel arrangement is referred to as a three-shaft arrangement since all three shafts are orientated parallel with each other so that accordingly in a direction which extends perpendicularly to the rotation axis of the individual shafts the structural space is larger in comparison with a two-shaft arrangement.

Moreover, the second switching group is constructed with at least one synchronization unit. Using such a synchronization unit, the power path of the second switching group can be preselected. This means that the synchronization units determine the power path of the second switching group via which transmission is intended to be carried out. To this end, the second switching group is constructed in the form of a dual-clutch gear mechanism so that the transmission units are divided into two separate part-gear mechanisms. The switching of the transmission units is then carried out via the switching of the synchronization units, wherein the part-gear mechanisms are each connected via a clutch, for example, a multi-disc clutch. The switching of the synchronization units is also referred to as preselection.

In a synchronization unit, in a similar manner to in a multi-disc clutch, two shafts which are arranged coaxially with respect to each other and which can be rotated are contacted at the end side by a synchronization ring, wherein the synchronization ring forms a frictional engagement between the individual shafts and leads to a synchronization of the rotation speeds.

In this instance, the synchronization units may also be constructed in such a manner that they can in each case preselect a plurality of, for example, two power paths. Accordingly, the synchronization units then have, for example, three switching states, wherein in a first switching state a first transmission unit, in a second switching state a second transmission unit and in a third switching state no transmission unit may be coupled.

The first or the second switching group has/have at least three, or at least four transmission units, wherein, however, other transmission units, for example, five, six or more transmission units, may also be provided. With an exemplary number of four transmission units in the first switching group, a total of seven switching states are produced for the first switching group since two transmission units can also in each case be connected to each other in a different power path. The second switching group transmits the mechanical power only over one power path so that accordingly on four transmission units in the second switching group a total of 28 gears are possible. This number of gears is available in this case both for forward travel and reverse travel. With only three transmission units both in the first and in the second switching group, there are a total number of 15 gears both for forward and reverse travel.

The present disclosure also relates to the use of a gear mechanism according to the present disclosure in an agricultural machine and a method for operating a gear mechanism.

According to this method, the switching states of the first switching group are passed through in such a manner that alternately either only one transmission unit of the first power path or a transmission unit both in the first and at least in the second power path are connected. In this instance, with a common switching of the first and the second power path, the planetary clutch between the power outputs of the planetary stage is not coupled.

According to a development of the method, first the switching states of the first switching group and only afterwards the switching states of the second switching group are successively passed through. This means that, when the gear mechanism is changed up, initially only all switching states of the first switching group are passed through, only then is the second switching group moved into a new switching state and the individual switching states of the first switching group are passed through again. This sequence is maintained until the last switching state in the second switching group is also reached.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 4 shows a switching matrix for forward operation of the gear mechanism according to FIG. 2.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
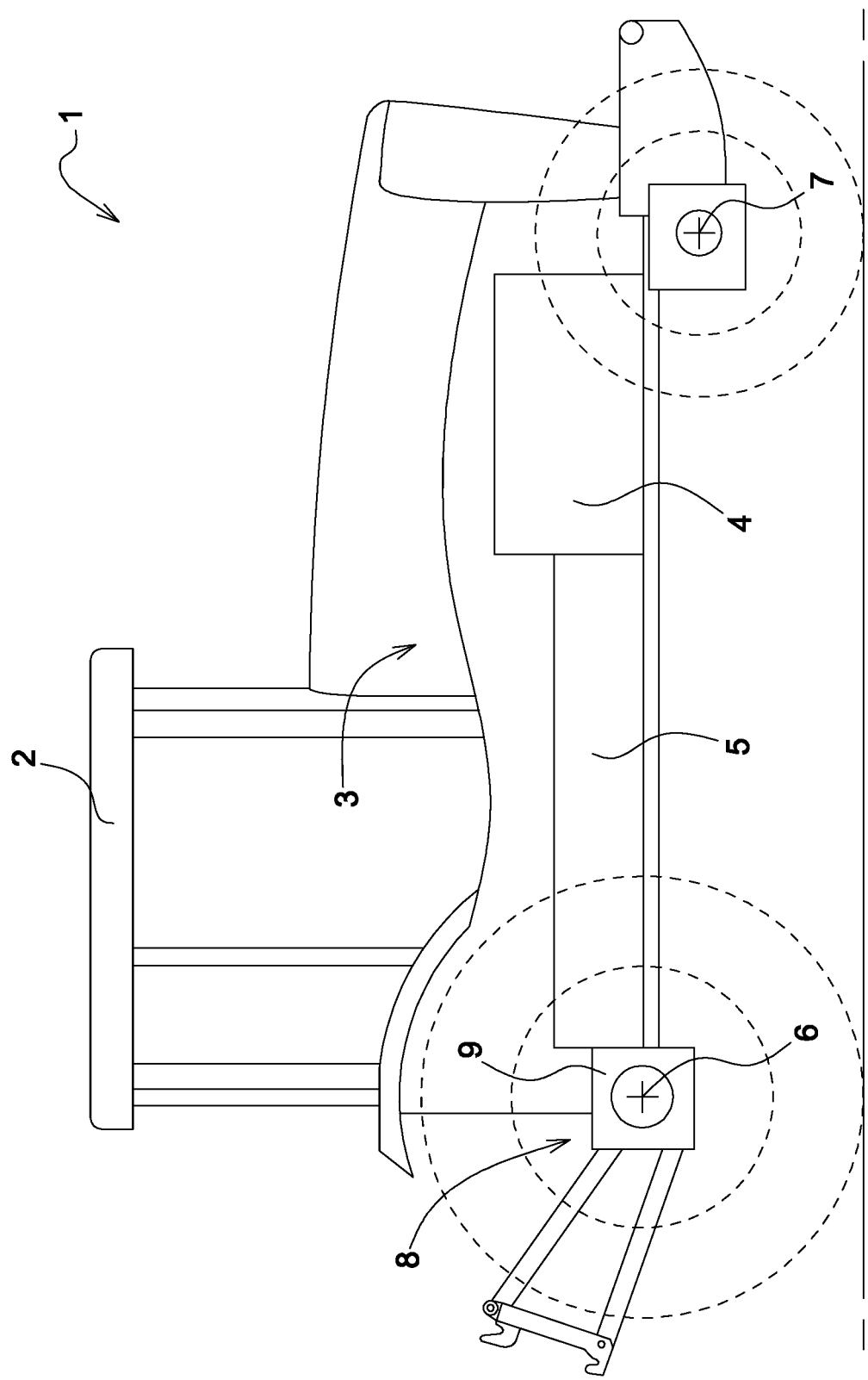
FIG. 1 shows an agricultural machine with a drive train which comprises a gear mechanism according to the present disclosure.

FIG. 1 shows an agricultural machine 1 in the form of a tractor with a cabin 2 and a drive train 3, wherein the drive train 3 comprises a drive motor 4 and a gear mechanism 5. The drive motor 4 is constructed as an internal combustion engine. There is further provided a travel drive 8 which has an axle gear mechanism 9 and a permanently driven rear vehicle axle 6. In addition, the travel drive 8 comprises a front vehicle axle 7 which is driven as necessary.

Figure 2:
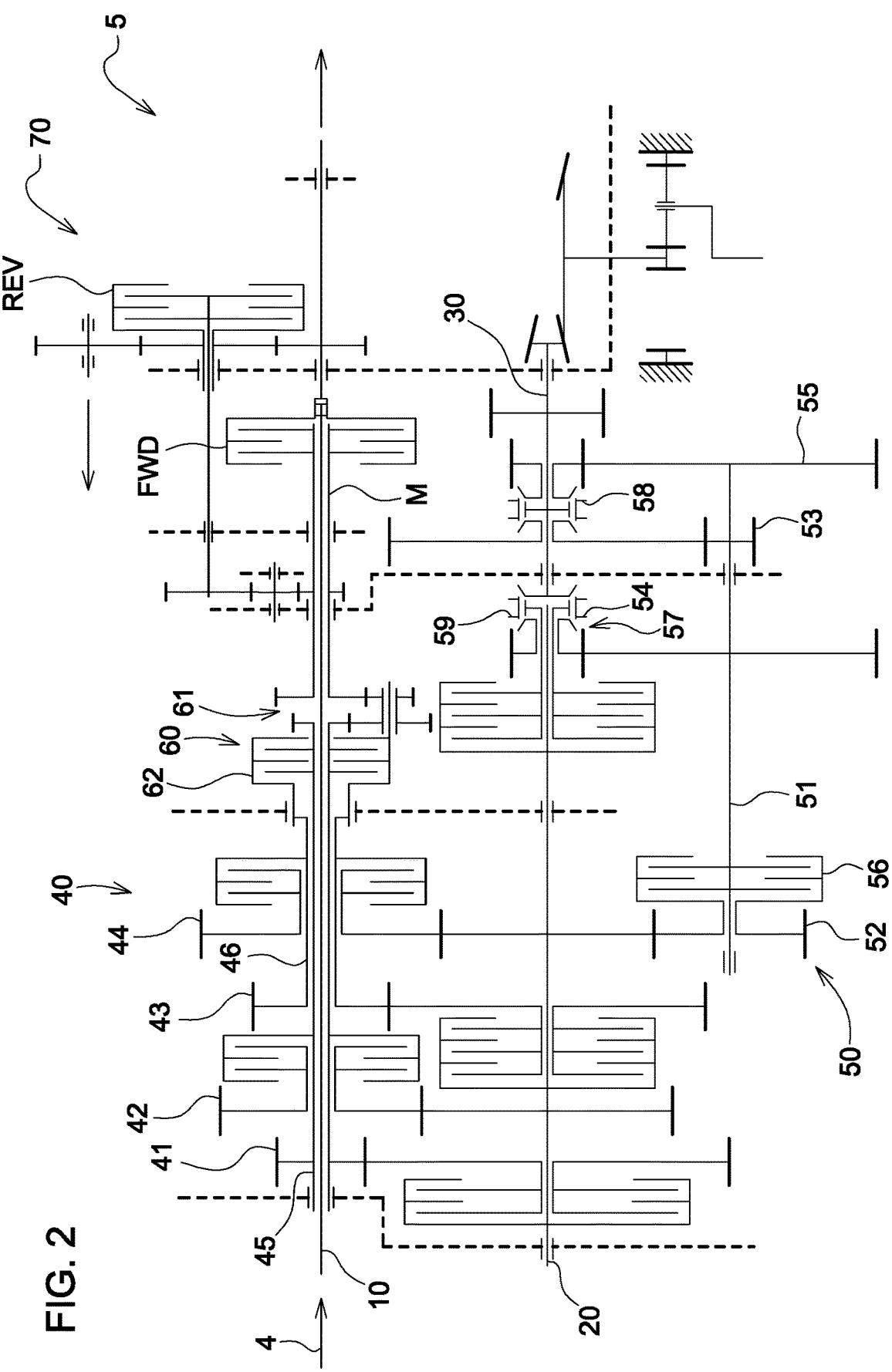
FIG. 2 shows a gear mechanism with a two-shaft design.
Figure 3:
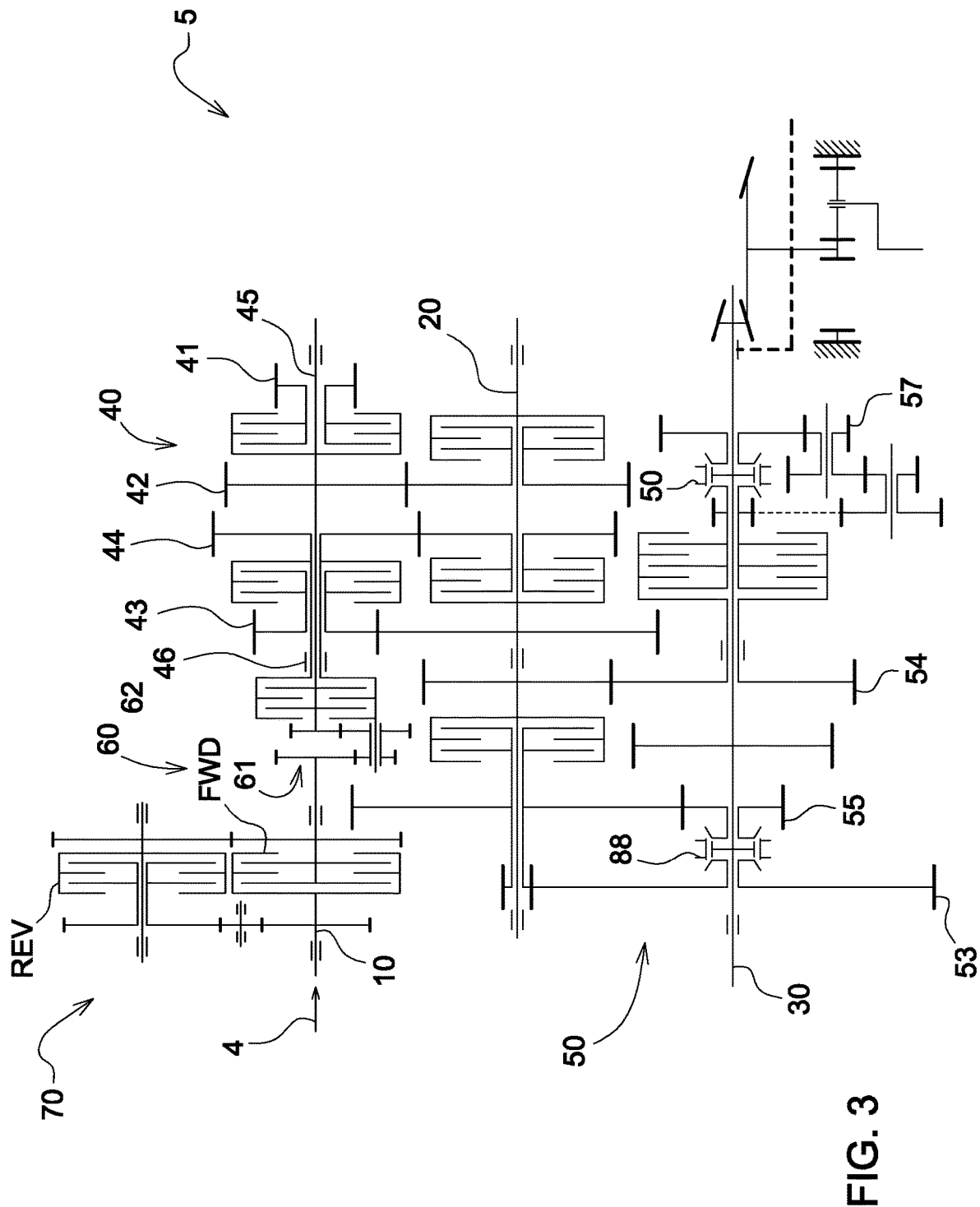
FIG. 3 shows a gear mechanism with a three-shaft design.

The gear mechanism 5 according to the present disclosure is illustrated in FIGS. 2 and 3, wherein the embodiment illustrated in FIG. 2 is a so-called two-shaft design and in FIG. 3 a so-called three-shaft design.

According to FIG. 2, there are provided three shafts 10, 20, 30 which are arranged parallel with each other and wherein in each case the first shaft 10 and the second shaft 20 are connected to each other by a first switching group 40 and the second shaft 20 and the third shaft 30 are connected to each other by a second switching group 50. The first shaft 10 is driven by the drive motor 4 and accordingly has a speed which is adjusted to the drive motor 4. At the rear end of the first shaft 10 there is provided a multi-disc clutch FWD via which the first shaft 10 can be directly coupled to an input outer shaft portion 11. This input outer shaft portion 11 surrounds the first shaft 10 peripherally and has in a coupled state of the multi-disc clutch FWD the same speed as the first shaft 10.

Furthermore, there are provided on the first shaft 10 two additional outer shaft portions which are referred to below as output outer shaft portions 45, 46. The second output outer shaft portion 46 surrounds in this instance both the first shaft 10 and the first output outer shaft portion 45. The output outer shaft portions 45, 46 can be connected by a planetary arrangement 60 to the input outer shaft portion 11 so that each of the two output outer shaft portions 45, 46 can form an individual power path of the first switching group 40, via which in each case or together a mechanical power can be transmitted to the second shaft 20.

The planetary arrangement 60 comprises, on the one hand, a planetary stage 61 and a planetary clutch 62, wherein the planetary stage 61 has two sun gears which are arranged beside each other and two planetary gears which are arranged beside each other and which each have a planetary carrier. The two planetary carriers are in this instance coupled directly to each other and connected via a first sun gear to the input outer shaft portion 11. At the output, the planetary carriers are connected to the external disc carrier of the planetary clutch 62 and the output-side sun gear is connected to the internal disc carrier of the planetary clutch 62. On further consideration, it becomes clear that again the inner disc carrier of the planetary clutch 62 is connected to the first output outer shaft portion 45 and the external disc carrier is connected to the second output outer shaft portion 46.

Both output outer shaft portions 45, 46 each have two transmission units 41, 42, 43, 44 in the form of toothed wheel pairs, wherein the driving toothed wheels of the transmission units 41, 42 are arranged on the first output outer shaft portion 45 and the drive toothed wheels of the transmission units 43, 44 are arranged on the second output outer shaft portion 46. The output toothed wheels of the transmission units 41, 42, 43, 44 are arranged on the second shaft 20. As a result of such an embodiment, either the transmission units 41, 42, 43, 44 can be connected individually or in each case in a combination of a transmission unit 41, 42 of the first output outer shaft portion 45 with a transmission unit 43, 44 of the second output outer shaft portion 46, wherein the mechanical power is then transmitted via two power paths to the second shaft 20. Each transmission unit 41, 42, 43, 44 is further associated with a multi-disc clutch 41', 42', 43', 44'.

The second switching group 50 is constructed as a conventional spur gear set in the form of a dual clutch gear mechanism. The dual clutch gear mechanism contains two part-gear mechanisms in which different transmission units 53, 55, 57 are arranged. Furthermore, in order to produce the part-gear mechanisms, auxiliary shafts 51a, 51b are provided. The auxiliary shaft 51b coincides in this instance with the output shaft 30. The auxiliary shaft 51a is driven via the output toothed wheel of the transmission unit with the drive toothed wheel 44, wherein this drive toothed wheel 44 always rotates regardless of the position of the planetary clutch 62 and consequently the auxiliary shaft 51 can also always be driven. The individual part-gear mechanisms can be connected by the multi-disc clutches 56a, 56b.

There are further provided synchronization units 54, 58 which, on the one hand, provide a gear speed as a direct clutch and which at the same time also enable a connection of the individual transmission units 53, 55, 57.

FIG. 3 shows the gear mechanism according to FIG. 2 in a three-shaft arrangement, wherein the third shaft 30 is no longer arranged coaxially with respect to the second shaft 20, but instead parallel with the first and second shaft 10, 20. In such an embodiment, an auxiliary shaft 51 is no longer required. However, the significant components remain substantially the same. In contrast to the gear mechanism according to FIG. 2, the switching of the transmission unit 57 additionally requires the switching of the synchronization unit 58 into the corresponding position so that the mechanical power can be transmitted to the auxiliary shaft 51b or to the output shaft 30. According to FIG. 3, this is not required.

FIG. 4 shows the switching matrix for the forward operation of the agricultural machine 1 with a gear mechanism according to FIG. 2. With reference to the switching matrix, it can be seen that in each case alternately always only one transmission unit 41, 42, 43, 44 is connected in the first switching group 40 and, in a subsequent gear speed, two transmission units 41, 42, 43, 44 in each case, wherein the two transmission units 41, 42, 43, 44 are associated with different output outer shaft portions 45, 46 and consequently two different power paths. On the whole, with four transmission units 41, 42, 43, 44, a total of seven gear speeds are consequently possible. The switching of the second switching group 50 is arranged downstream of the first switching group 40. The synchronization unit 58 may in this instance connect either the transmission unit 53 or the transmission unit 57. In contrast, the synchronization unit 59 connects either the transmission unit 57 or in a direct gear speed the auxiliary shaft 51b or the output shaft 30.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A gear mechanism, comprising:
at least a first and a second shaft; and
at least a first and a second switching group arranged between the first and the second shaft, wherein each of the switching groups comprises at least two transmission units which are individually switched and comprise a different transmission ratio;
wherein, the first switching group is movable into active connection with the first shaft by a planetary stage which is constructed such that a mechanical power which is introduced via the first shaft is transmitted to the second shaft via a first or a second power path;
wherein, at least one transmission unit of the first switching group is associated with each power path;
wherein, in at least one switching state of the first switching group, a power flow extends over at least one transmission unit of the first and the second power path;
wherein the planetary stage includes a power input and at least two power outputs which are each connected to one of the power paths; and
wherein a planetary coupling is arranged between the two power outputs of the planetary stage, the planetary coupling in a connected state connects the two power outputs directly to each other.

2. The gear mechanism according to claim 1, wherein:
the first switching group comprises at least two outer shaft portions which coaxially surround the first shaft,
at least one of the transmission units is associated with one of the outer shaft portions, and
a first outer shaft portion is associated with the first power path and a second outer shaft portion is associated with the second power path.

3. The gear mechanism according to claim 2, wherein the first power output is connected to the first outer shaft portion and the second power output is connected to the second outer shaft portion.

4. The gear mechanism according to claim 3, wherein the disc carriers are connected to one of the outer shaft portions.

5. The gear mechanism according to claim 1, wherein the planetary coupling comprises a multi-disc clutch having an inner and an outer disc carrier, and wherein the disc carriers are connected to one of the power outputs of the planetary stage and one of the power paths.

6. The gear mechanism according to claim 1, wherein the transmission units are constructed at least partially as toothed wheel pairs or as a direct clutch.

7. The gear mechanism according to claim 1, further comprising a third shaft arranged between the first shaft and the second shaft, wherein the first switching group is arranged between the first and the second shafts and the second switching group is arranged between the second and the third shafts.

8. The gear mechanism according to claim 1, wherein a clutch is associated with each transmission unit of the first switching group,
wherein, each transmission unit is coupled or uncoupled via the clutch.

9. The gear mechanism according to claim 1, wherein the transmission units of the second switching group are at least partially coupled or uncoupled by a synchronization unit.

10. The gear mechanism according to claim 1, wherein the first or the second switching group comprises at least three transmission units.

11. A gear mechanism, comprising:
at least a first and a second shaft; and
at least a first and a second switching group arranged between the first and the second shaft, wherein each of the switching groups comprises at least two transmission units which are individually switched and comprise a different transmission ratio;
wherein, the first switching group is movable into active connection with the first shaft by a planetary stage which is constructed such that a mechanical power which is introduced via the first shaft is transmitted to the second shaft via a first or a second power path;
wherein, at least one transmission unit of the first switching group is associated with each power path;
wherein, in at least one switching state of the first switching group, a power flow extends over at least one transmission unit of the first and the second power path;
wherein between the first shaft and the planetary stage there is arranged a reversing unit which comprises a coupled state and an uncoupled state; and
wherein, in the coupled state, the reversing unit reverses a rotation direction of the planetary stage.

12. The gear mechanism according to claim 11, wherein the planetary stage comprises a power input and at least two power outputs which are each connected to one of the power paths.

13. The gear mechanism according to claim 12, wherein a planetary coupling is arranged between the two power outputs of the planetary stage, the planetary coupling in a connected state connects the two power outputs directly to each other.

14. The gear mechanism according to claim 13, wherein the first power output is connected to a first outer shaft portion and the second power output is connected to a second outer shaft portion.

15. The gear mechanism according to claim 14, wherein the disc carriers are connected to one of the outer shaft portions.

16. The gear mechanism according to claim 13, wherein the planetary coupling comprises a multi-disc clutch having an inner and an outer disc carrier, and wherein the disc carriers are connected to one of the power outputs of the planetary stage and one of the power paths.

17. The gear mechanism according to claim 11, further comprising a third shaft arranged between the first shaft and the second shaft, wherein the first switching group is arranged between the first and the second shafts and the second switching group is arranged between the second and the third shafts.

18. An agricultural machine, comprising:
a cabin;
a drive train including a drive motor and a gear mechanism; and
a travel drive comprising an axle gear mechanism;
wherein, the gear mechanism comprises:
 a first shaft and a second shaft; and
 a first switching group and a second switching group, the switching groups arranged between the first and the second shafts;
 wherein each of the switching groups comprises at least two transmission units which are individually switched and comprise a different transmission ratio;
 wherein, the first switching group is movable into active connection with the first shaft by a planetary stage which is constructed such that a mechanical power which is introduced via the first shaft is transmitted to the second shaft via a first or a second power path;
 wherein, at least one transmission unit of the first switching group is associated with each power path;
 wherein, in at least one switching state of the first switching group, a power flow extends over at least one transmission unit of the first and the second power path;
 wherein the planetary stage comprises a power input and at least two power outputs which are each connected to one of the power paths; and
 wherein a planetary coupling is arranged between the two power outputs of the planetary stage, the planetary coupling in a connected state connects the two power outputs directly to each other.

19. The agricultural machine according to claim 18, wherein:
the first switching group comprises at least two outer shaft portions which coaxially surround the first shaft,
at least one of the transmission units is associated with one of the outer shaft portions, and
a first outer shaft portion is associated with the first power path and a second outer shaft portion is associated with the second power path.

20. An agricultural machine, comprising:
a cabin;
a drive train including a drive motor and a gear mechanism; and
a travel drive comprising an axle gear mechanism;
wherein, the gear mechanism comprises:
 a first shaft and a second shaft; and
 a first switching group and a second switching group, the switching groups arranged between the first and the second shafts;
 wherein each of the switching groups comprises at least two transmission units which are individually switched and comprise a different transmission ratio;
 wherein, the first switching group is movable into active connection with the first shaft by a planetary stage which is constructed such that a mechanical power which is introduced via the first shaft is transmitted to the second shaft via a first or a second power path;
 wherein, at least one transmission unit of the first switching group is associated with each power path;
 wherein, in at least one switching state of the first switching group, a power flow extends over at least one transmission unit of the first and the second power path;
 wherein between the first shaft and the planetary stage there is arranged a reversing unit which comprises a coupled state and an uncoupled state; and
 wherein, in the coupled state, the reversing unit reverses a rotation direction of the planetary stage.

21. A method for operating a gear mechanism, comprising:
providing the gear mechanism with including a first shaft, a second shaft, a first switching group, a second switching group, and at least two transmission units for each switching group;
moving the first switching group into connection with the first shaft by a planetary stage;
transmitting power introduced by the first shaft to the second shaft via a first or a second power path;
extending a power flow over at least one transmission unit of the first and the second power path;
passing through switching states of the first switching group such that alternately either only one transmission unit of the first power path or in each case one transmission unit both in the first and at least in the second power path are connected; and
decoupling a planetary clutch between the power outputs of the planetary stage with a common switching of the first and the second power paths.

* * * * *